(12) United States Patent
Pellaton et al.

(10) Patent No.: US 12,116,904 B2
(45) Date of Patent: Oct. 15, 2024

(54) MOVABLE VANE FOR A WHEEL OF A TURBINE ENGINE

(71) Applicant: SAFRAN HELICOPTER ENGINES, Bordes (FR)

(72) Inventors: Bertrand Guillaume Robin Pellaton, Moissy-Cramayel (FR); Lucas Benassis, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 18 days.

(21) Appl. No.: 17/597,982

(22) PCT Filed: Jul. 29, 2020

(86) PCT No.: PCT/FR2020/051397
§ 371 (c)(1),
(2) Date: Jan. 31, 2022

(87) PCT Pub. No.: WO2021/023927
PCT Pub. Date: Feb. 11, 2021

(65) Prior Publication Data
US 2022/0316346 A1    Oct. 6, 2022

(30) Foreign Application Priority Data
Aug. 7, 2019  (FR) ...................................... 1909053

(51) Int. Cl.
*F01D 5/22* (2006.01)
*F01D 11/00* (2006.01)
(Continued)

(52) U.S. Cl.
CPC ............... *F01D 5/22* (2013.01); *F01D 5/225* (2013.01); *F01D 11/001* (2013.01); *F01D 11/10* (2013.01);
(Continued)

(58) Field of Classification Search
CPC .... F01D 11/001; F01D 11/122; F01D 11/127; F01D 5/22; F01D 5/225; F05D 2220/323;
(Continued)

(56) References Cited

U.S. PATENT DOCUMENTS 7,632,062 B2 * 12/2009 Harvey ..................... F01D 5/20
415/173.1
9,856,739 B2 * 1/2018 Bedrosyan .............. F01D 5/187
(Continued)

OTHER PUBLICATIONS

International Search Report received for PCT Patent Application No. PCT/FR2020/051397, mailed on Oct. 21, 2020, 5 pages (2 pages of English Translation and 3 pages of Original Document).
(Continued)

*Primary Examiner* — Brian P Wolcott
(74) *Attorney, Agent, or Firm* — WOMBLE BOND DICKINSON (US) LLP

(57) ABSTRACT

Disclosed is a movable vane (1) for a wheel (2) of an aircraft turbine engine, the vane (1) comprising a blade (4) delimited by an outer heel (8) comprising a first seal (14), the vane (1) comprising an internal circuit (16) suitable for receiving a first minor gas flow (f1), this circuit (16) comprising a supply cavity (17) opening at the root (9) via at least one inlet opening (18), characterised in that the circuit (16) comprises at least two channels (19) connected with the supply cavity (17) and each opening on an outer surface of the first seal (14) via a discharge opening such that a gas jet (J) of the first minor gas flow (f1) is capable of being discharged from each discharge opening, each channel (19) being oriented such that the corresponding gas jet (J) is capable of being projected towards a second minor gas flow (f2) escaping between the heel (8) and a directly adjacent member (22).

17 Claims, 6 Drawing Sheets

(51) Int. Cl.
*F01D 11/10* (2006.01)
*F01D 11/12* (2006.01)

(52) U.S. Cl.
CPC .......... *F01D 11/122* (2013.01); *F01D 11/127* (2013.01); *F05D 2220/323* (2013.01); *F05D 2240/55* (2013.01); *F05D 2250/283* (2013.01)

(58) Field of Classification Search
CPC ............ F05D 2240/11; F05D 2240/55; F05D 2240/307; F05D 2250/283
See application file for complete search history.

(56) References Cited

U.S. PATENT DOCUMENTS

| | | | |
|---|---|---|---|
| 10,301,945 B2* | 5/2019 | Chouhan | F01D 5/187 |
| 10,704,406 B2* | 7/2020 | Walunj | F01D 5/18 |
| 11,015,453 B2* | 5/2021 | Smith | F04D 29/324 |
| 11,208,909 B2* | 12/2021 | Telman | F01D 11/006 |
| 2005/0232771 A1 | 10/2005 | Harvey et al. | |
| 2007/0134096 A1 | 6/2007 | Mons et al. | |
| 2017/0175535 A1 | 6/2017 | Chouhan et al. | |
| 2018/0355727 A1 | 12/2018 | Walunj et al. | |
| 2018/0355742 A1* | 12/2018 | Telman | F01D 5/187 |

OTHER PUBLICATIONS

European Search Report and Search Opinion received for European Application No. 23186599.9, mailed on Oct. 10, 2023, 11 pages (3 pages of English Translation and 9 pages of Original Document).

* cited by examiner

MOVABLE VANE FOR A WHEEL OF A TURBINE ENGINE

TECHNICAL FIELD OF THE INVENTION

The present invention relates to the general field of movable vanes for a wheel of an aircraft turbine engine.

TECHNICAL BACKGROUND

Classically, an axial turbine of a turbine engine comprises a succession of axial stages arranged one behind the other. Each stage comprises a bladed impeller forming a rotor and a bladed turbine stator forming the stator. The wheel is rotated opposite the corresponding turbine stator. Each turbine stator is attached to an outer casing surrounding the wheel.

The wheel comprises an annular disc that is rotatable about an axis X, and a plurality of vanes attached to the disc.

A movable vane comprises an aerodynamic blade extending along a stacking axis Z. The blade of the vane is delimited by an inner root and an outer heel along the stacking axis Z.

The outer heels of the movable vanes of the same wheel are arranged flank to flank (or edge to edge) with each other, so as to externally delimit a vein in which a major gas flow circulates.

In order to optimise the efficiency of the turbine (and more generally of the turbine engine), it is necessary to maximise the quantity of gas acting on the blades, and in other words to minimise the leaks present essentially between the heels and the outer casing and between two adjacent heels.

In order to limit the leakage between a heel and the outer casing, it is known to implant on the heel of each blade at least one lip, for example two, protruding towards the outside from a platform of the heel. The lips are intended to cooperate with a block of abradable material (e.g. a honeycomb structure) fixed to the outer casing, to form a labyrinth-type dynamic seal joint. However, such a joint does not guarantee a complete sealing between the heel and the block of abradable material.

In order to limit the leakage between two adjacent heels, it is usual to limit the clearance between two adjacent heels. However, it should be noted that the clearance between two heels changes according to the operating speed of the turbine engine, so that sealing may be guaranteed at one operating speed and no longer be guaranteed at another operating speed.

In order to maximise efficiency, the engine manufacturers are therefore continually seeking to minimise the leakage between a heel and the block of abradable material and between two adjacent heels.

The objective of the present invention is therefore to provide a simple, effective and economical solution to the above problem.

The prior art also comprises the documents US-A1-2018/355742 and US-A1-2007/134096.

SUMMARY OF THE INVENTION

The invention thus proposes a movable vane for a wheel of an aircraft turbine engine, the vane comprising an aerodynamic blade extending along a stacking axis Z, the blade being delimited by an inner root and an outer heel along the stacking axis Z, the heel comprising at least a first protruding lip intended to cooperate with a block of abradable material, the vane comprising an internal circuit capable of receiving a first minor gas flow, this circuit comprising a supply cavity opening at the root via at least one inlet opening, characterised in that the circuit comprises at least two ducts connected with the supply cavity and each opening onto an external surface of the first lip via a discharge opening such that a gas jet of the first minor gas flow is adapted to be expelled from each discharge opening, each duct being oriented such that the corresponding gas jet is adapted to be projected towards a second minor gas flow leaking between the heel and a directly adjacent member.

The gas jets (first minor flow) thus oppose the second minor gas flow, and more precisely the gas jets shear the second minor gas flow, so as to reduce its flow rate, and thus reduce the leakage of the second minor gas flow between the heel and the directly adjacent member.

Such a reduction in the flow rate of the second minor gas flow maximises the efficiency of the turbine engine.

The directly adjacent member corresponds, for example, to the block of abradable material or the heel of a directly adjacent vane.

The vane according to the invention may comprise one or more of the following features, taken in isolation from each other or in combination with each other:
- the discharge openings are arranged according to one of the following alternatives:
- the two discharge openings are arranged at an outer face of the first lip;
- the two discharge openings are arranged at a lateral face of the first lip;
- one of the two discharge openings is arranged at an outer face of the first lip, and the other of the two discharge openings is arranged at a lateral face of the first lip;
- the circuit comprises a first row of at least three ducts connected with the supply cavity and each opening onto an external surface of the first lip via a discharge opening;
- the circuit comprises a second row comprising at least three ducts connected with the supply cavity and each opening onto the external surface of the first lip via a discharge opening, the discharge openings of the ducts of the first row being staggered with respect to the discharge openings of the ducts of the second row;
- at least one of the ducts has a variable cross-section which converges towards the corresponding discharge opening;
- the supply cavity is adapted to receive the first minor gas flow escaping from a vein via at least the inlet opening, the vein being adapted to receive a major gas flow;
- each discharge opening is circular;
- the diameter of the discharge opening of each duct is between 0.2 mm and 2 mm, and preferably between 0.3 mm and 0.6 mm;
- the heel comprises a second lip, protruding and distant from the first lip;
- the circuit comprises at least two ducts connected with the supply cavity and each opening onto an external surface of the second lip via a discharge opening so that a gas jet of the first minor gas flow is adapted to be expelled from each discharge opening, each duct being oriented so that the corresponding gas jet is adapted to be projected towards a second minor gas flow leaking between the heel and a directly adjacent member.

The present invention further relates to a wheel for an aircraft turbine engine, comprising a disc carrying at its periphery an annular row of vanes as previously described.

The present invention also relates to an aircraft turbine engine comprising a vane as described above or a wheel as described above.

BRIEF DESCRIPTION OF THE FIGURES

The invention will be better understood and other details, features and advantages of the invention will become clearer on reading the following description made by way of non-limiting example and with reference to the attached drawings in which.

DETAILED DESCRIPTION OF THE INVENTION

Figure 1:
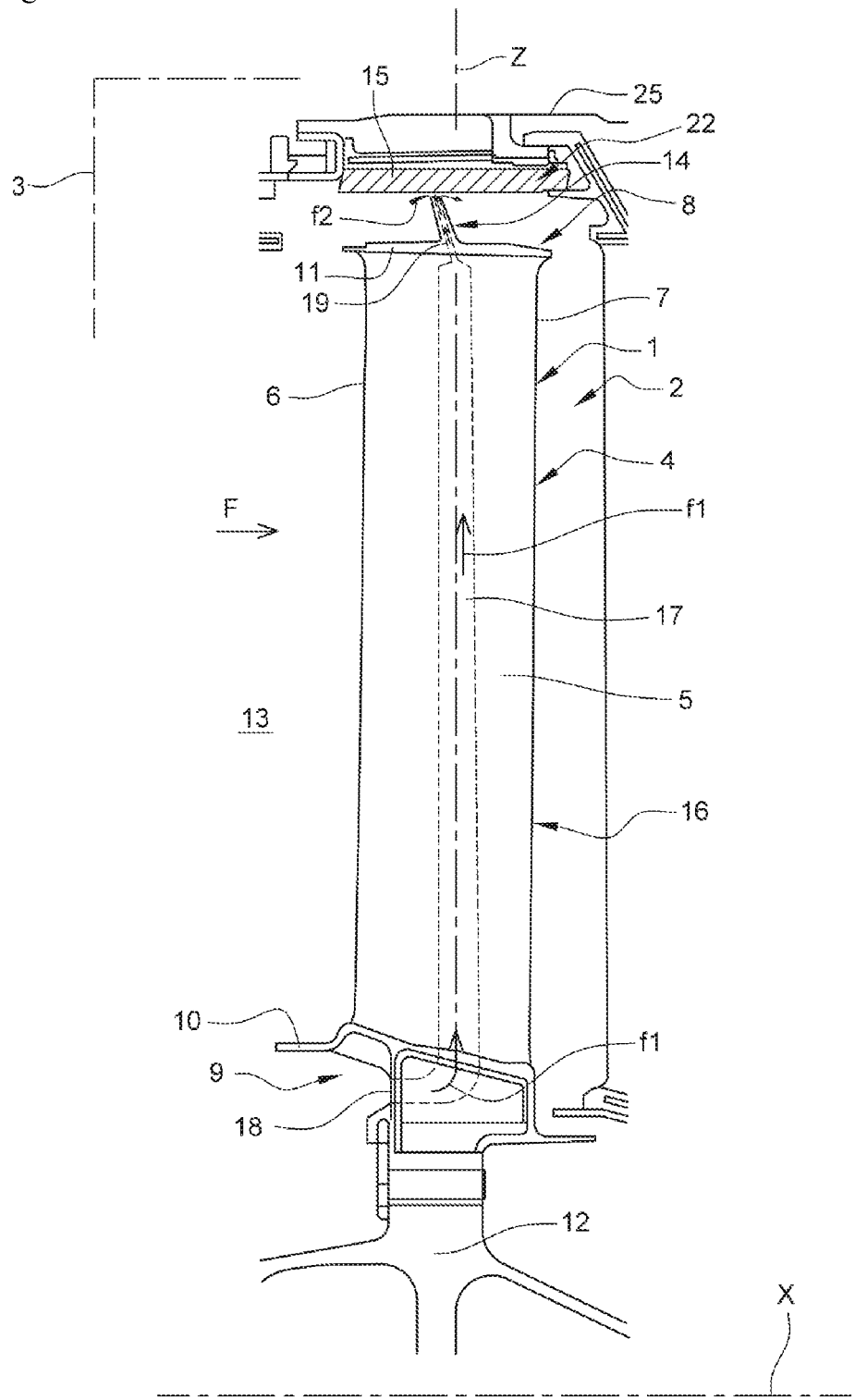
FIG. 1 is a front view of a vane according to a first embodiment of the invention.

FIG. 1 shows a vane 1 of a wheel 2 of an aircraft turbine engine 3, and more precisely a vane 1 of a wheel 2 of a turbine of the turbine engine 3. The vane 1 could be intended to be fitted to a wheel of a compressor of the turbine engine.

The vane 1 comprises an aerodynamic blade 4 extending along a stacking axis Z. The blade 4 has a pressure side face 5 and a suction side face connected to each other by a leading edge 6 and a trailing edge 7. A major gas flow F flows around the blade 4 from the leading edge 6 to the trailing edge 7, the leading edge 6 thus being arranged upstream of the trailing edge 7 in the direction of flow of the major gas flow F.

In a transverse plane (plane perpendicular to the stacking axis Z), the blade 4 is profiled along a mean line connecting the leading edge 6 to the trailing edge 7, the mean line separating the vane 1 into a pressure and an suction side. The pressure and suction side faces 5 are curved, and concave and convex respectively.

In the present application, the terms "pressure side" and "suction side" associated with the different elements of the vane refer to the pressure side and the suction side.

In the present application, the terms "upstream" and "downstream" are defined with respect to the direction of flow of the major gas flow F.

The vane 1 further comprises an outer heel 8 and an inner root 9 delimiting the blade 4 along the stacking axis Z. More precisely, the blade 4 is delimited by an inner platform 10 of the root 9 and an outer platform 11 of the heel 8.

A wheel 2 comprises a disc 12 carrying at its periphery an annular row of vanes 1. More precisely, each root 9 comprises for example a bulb configured to be engaged in a complementary pocket made in the disc 12. The wheel 2 (respectively the vane) is rotatable about an axis of rotation X, coaxial with the longitudinal axis of the turbine engine 3. The wheel 2 is rotatable about the axis X from the pressure side to the suction side.

In the present application, the terms "inner" and "outer" are defined with respect to the axis of rotation X of the wheel (or the vane).

The outer platforms 11 of the movable vanes 1 of the same wheel 2 are arranged flank to flank (or edge to edge) with each other, so as to externally delimit a vein 13 in which the major gas flow F circulates. Similarly, the inner platforms 10 of the movable vanes 1 of the same wheel 2 are arranged flank to flank (or edge to edge) with each other, so as to internally delimit the vein 13 in which the major gas flow F circulates.

The heel 8 of a vane 1 comprises at least one protruding lip 14 (first lip) intended to cooperate with a block of abradable material 15. The vane 1 also comprises an internal circuit 16 capable of receiving a first minor gas flow f1, this circuit 16 comprising a supply cavity 17 opening at the root 9 via at least one inlet opening 18.

According to the invention, the circuit 16 comprises at least two ducts 19 connected with the supply cavity 17 and each opening onto an external surface 20 of the lip 14 via a discharge opening 21 so that a gas jet J of the first minor gas flow f1 is able to be expelled from each discharge opening 21. Each duct 19 is oriented such that the corresponding gas jet J is adapted to be projected towards a second minor gas flow f2 leaking between the heel 8 and a directly adjacent member 22.

In the present application, the term "internal" associated with an element of the vane indicates that this element is arranged inside the vane. Conversely, the term "external" associated with an element of the vane indicates that this element is arranged outside the vane.

The first minor gas flow f1 corresponds to a flow escaping from the vein 13 at the inner platform 10 and entering the supply cavity 17 of the circuit 16 via the inlet opening 18. Once inside the circuit 16, the first minor flow f1 flows from the root 9 to the heel 8 as a result of the rotation of the vane 1 around the axis X.

The second minor gas flow f2 corresponds to a flow escaping from the vein 13 at the outer platform 11, and leaking between the heel 8 and a directly adjacent member 22 such as the block of abradable material 15 or the heel 8 of a directly adjacent vane 23. The second minor flow f2 flows from the upstream to downstream, this flow direction being due to the pressure difference between the upstream and downstream.

Figure 2:
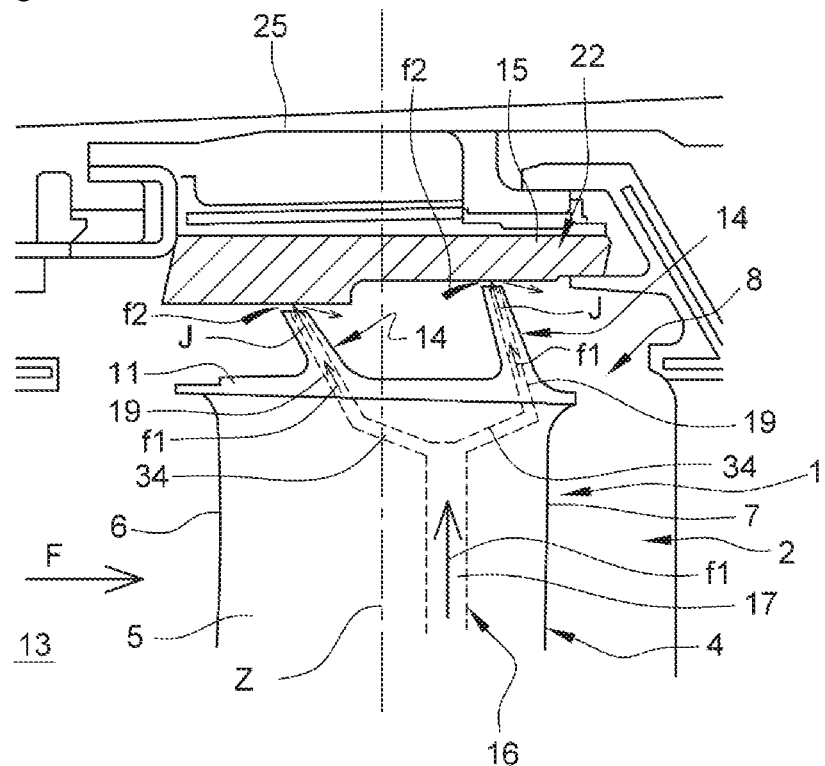
FIG. 2 is a partial front view of a vane according to a second embodiment of the invention.

The vane 1 comprises at least one lip 14, but may of course comprise more than one, for example two, as shown in FIG. 2. One lip 14 protrudes towards the outside from the outer platform 11. A lip 14 is intended to cooperate with a block of abradable material 15 (e.g. a honeycomb structure) attached to an outer casing 25 surrounding the wheel 2, to form a labyrinth type joint seal. A lip 14 may be straight and thus extend along the stacking axis Z. One lip 14 may be inclined (advantageously upstream) at an acute angle to the stacking axis Z. At least one lip is provided with ducts, and the other lips may or may not be provided with ducts.

The circuit 16 may comprise two ducts 19 for each lip 14, the two discharge openings 21 of which are arranged at an outer face 26 of the lip 14. In such a configuration, the gas jets J coming from the discharge openings 21 are projected towards a second minor gas flow f2 leaking between the heel 8 and the block of abradable material 15. The gas jets J (first minor flow) thus oppose the second minor gas flow f2 (the jets shear the second minor flow) so as to reduce its flow rate, and thus reduce the leakage between the heel 8 and the block of abradable material 15.

The circuit 16 may comprise, for each lip 14, two ducts 19, the discharge openings 21 of which are arranged at a lateral face 27 of the lip 14. The lateral face 27 comprises an upstream lateral face 28 (hereinafter referred to as the upstream face), a downstream lateral face 29 (hereinafter referred to as the downstream face), a pressure side lateral face 30 (hereinafter referred to as the pressure side face) and a suction side lateral face 31 (hereinafter referred to as the suction side face).

When a discharge opening 21 is arranged at an upstream face 28 (or a downstream face 29), the gas jet J coming from this discharge opening 21 is projected towards a second minor gas flow f2 leaking between the heel 8 and the block of abradable material 15. Such a gas jet J (first minor flow) opposes the second minor gas flow f2 (the jet shears the second minor flow) so as to reduce its flow rate, and thus reduce the leakage between the heel 8 and the block of abradable material 15.

When a discharge opening 21 is provided at a pressure side face 30 (or a suction side face 31), the gas jet J from this discharge opening 21 is projected towards a second minor gas flow f2 leaking between the heel 8 and a heel 8 of a directly adjacent vane 23. Such a gas jet J (first minor flow) opposes the second minor gas flow f2 (the jet shears the second minor flow) so as to reduce its flow rate, and thus reduce the leakage between two adjacent heels 8.

The circuit 16 may comprise, for each lip 14, two ducts 19 of which one of the two discharge openings 21 is arranged at an outer face 26 of the lip 14, and the other of the two discharge openings 21 is arranged at a lateral face 27 of the lip 14.

The circuit 16 may of course comprise, for each lip 14, more than two ducts 19, the discharge openings 21 of which are each arranged at an external surface 20 of the lip 14.

The circuit 16 may comprise, for each lip 14, a first row 32 of at least three ducts 19 connected with the supply cavity 17 and each opening onto the external surface 20 of the lip 14 via a discharge opening 21.

In the present application, a row comprises at least three ducts. Within a row, the pitch between two discharge openings may be constant or variable.

The circuit 16 may comprise, for each lip 14, a second row 33 of at least three ducts 19 connected with the supply cavity 17 and each opening onto the external surface 20 of the lip 14 via a discharge opening 21.

The discharge openings 21 of the ducts 19 of the first row 32 may be staggered with respect to the discharge openings 21 of the ducts 19 of the second row 33.

Of course, the circuit 16 may comprise more than two rows of at least three ducts per lip. The pitch between two consecutive rows may be constant or variable.

A duct 19 extends (or is defined) along an axis of elongation A from an inner end to the corresponding discharge opening 21. A duct 19 may have a constant cross-section along its axis of elongation A.

A duct 19 may have a variable cross-section along its axis of elongation A. Advantageously, a duct 19 has a variable cross-section which converges towards its discharge opening 21, so as to increase the velocity of the corresponding gas jet J, and thus increase the reduction of the flow rate of the second minor gas flow f2.

By way of example, a duct 19 (respectively the discharge opening) may be circular, rectangular, etc. in cross section.

Advantageously, when the discharge opening 21 is circular, the diameter of the opening 21 is between 0.2 mm and 2 mm, and preferably between 0.3 mm and 0.6 mm.

Regardless of the shape of the discharge opening 21, the maximum dimension of the discharge opening 21 is between 0.2 mm and 2 mm.

The shape of a discharge opening may differ from that of the rest of the duct.

A duct 19 (or the axis of elongation A of a duct) may, in a longitudinal plane, be straight and thus extend substantially along the stacking axis Z.

A duct 19 (or the axis of elongation A of a duct) may, in a longitudinal plane, be inclined at an acute angle $\alpha$ with respect to the stacking axis Z. Advantageously, a duct 19 is inclined upstream, so that the direction of the gas jet J (first minor flow) is opposite to the direction of flow of the second minor flow f2.

The ducts of a vane 1 may have equal geometrical (shape, orientation, etc.) and dimensional characteristics. On the contrary, depending on the importance of the leakage, each duct may have specific geometrical and dimensional characteristics.

The cavity 17 of the circuit 16 of a vane 1 is supplied (first minor gas flow) via at least one inlet opening 18 arranged at the root 9 of the vane 1. Advantageously, the cavity 17 has large dimensions, so as to minimise pressure losses. The ducts 19 are connected directly or indirectly to the cavity 17.

According to the first embodiment shown in FIG. 1, the vane 1 comprises a single median lip 14. The circuit 16 comprises a cavity 17 that extends along the stacking axis Z. The circuit 16 comprises two ducts 19, the two discharge openings 21 of which are arranged at the outer face 26 of the lip 14. The two ducts 19 are here connected directly to the cavity 17.

According to the second embodiment shown in FIG. 2, the vane 1 comprises an upstream lip 14 and a downstream lip 14. The circuit 16 comprises two upstream ducts 19, the two discharge openings 21 of which are arranged at the outer face 26 of the upstream lip 14 and two downstream ducts 19, the two discharge openings 21 of which are arranged at the outer face 26 of the downstream lip 14. The ducts 19 are here indirectly connected to the cavity 17, namely via intermediate passages 34.

The upstream lip or downstream lip could have no ducts (respectively discharge openings).

Figure 3:
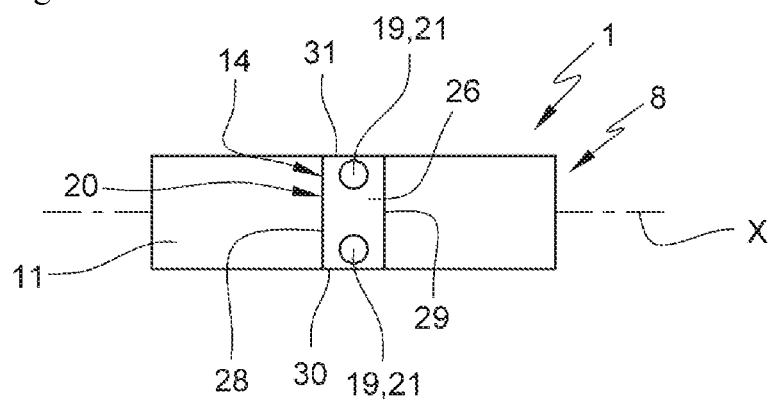
FIG. 3 is a partial schematic top view of a vane illustrating a first example of the arrangement of discharge openings on a lip.
Figure 4:
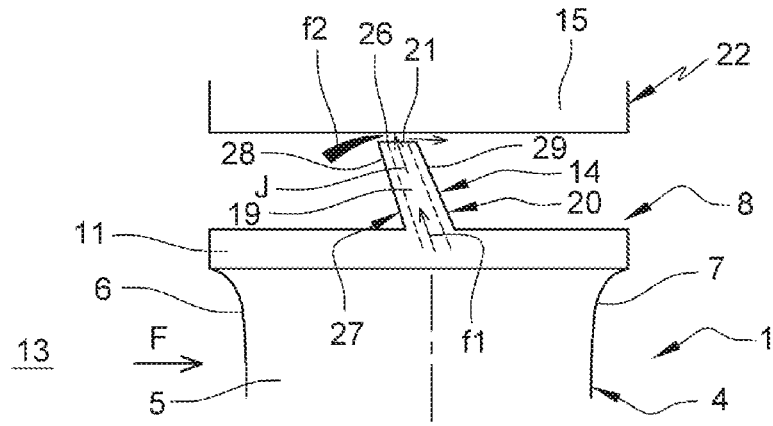
FIG. 4 is a partial schematic front view of the vane illustrated in FIG. 3.

FIGS. 3 and 4 illustrate a first example of the arrangement of the discharge openings 21 on a lip 14, in which the two discharge openings 21 are arranged at the outer face 26 of the lip 14.

Figure 5:
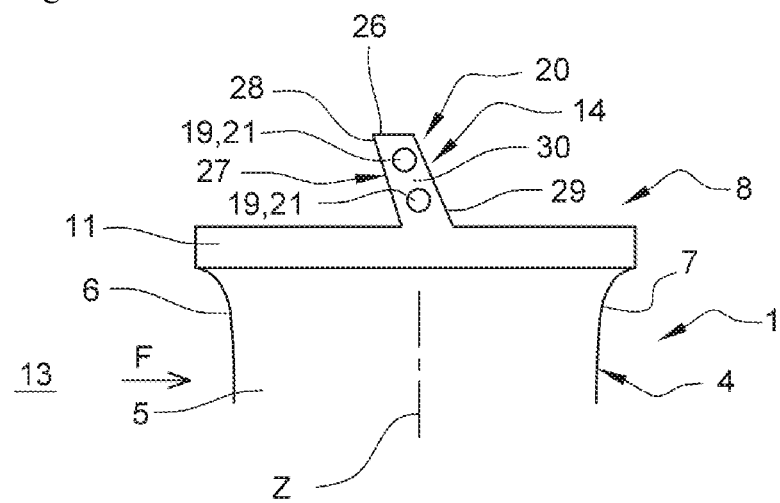
FIG. 5 is a schematic and partial front view of a vane illustrating a second example of the arrangement of discharge openings on a lip.
Figure 6:
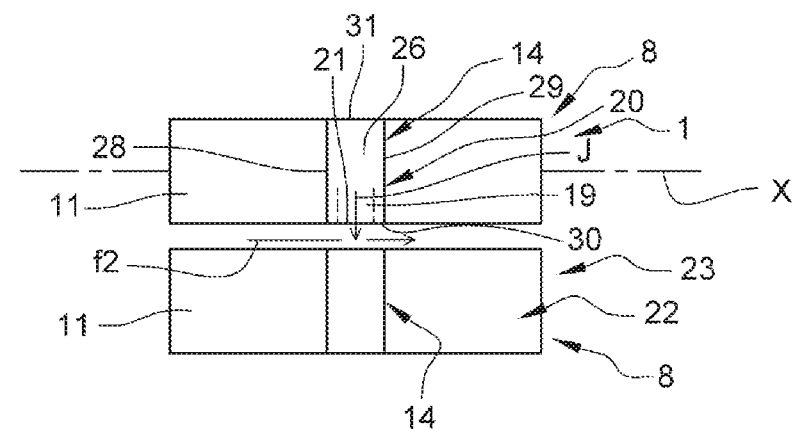
FIG. 6 is a schematic and partial top view of the vane illustrated in FIG. 5.

FIGS. 5 and 6 illustrate a second example of the arrangement of the discharge openings 21 on a lip 14, wherein the two discharge openings 21 are arranged at the pressure side face 30 of the lip 14.

Figure 7:
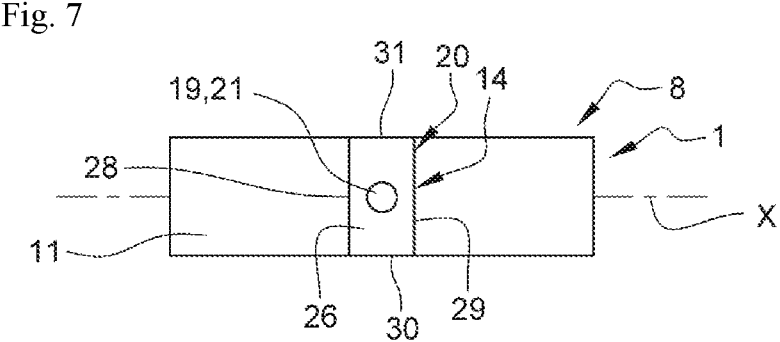
FIG. 7 is a schematic and partial top view of a vane illustrating a third example of the arrangement of discharge openings on a lip.
Figure 8:
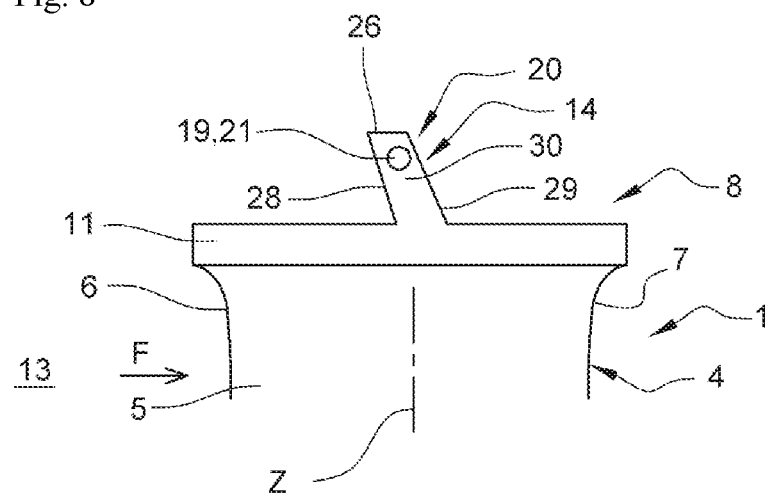
FIG. 8 is a schematic and partial front view of the vane illustrated in FIG. 7.

FIGS. 7 and 8 illustrate a third example of the arrangement of the discharge openings 21 on a lip 14, wherein one discharge opening 21 is arranged at the outer face 26 of the lip 14 and a discharge opening 21 is arranged at the pressure side face 30 of the lip 14.

Figure 9:
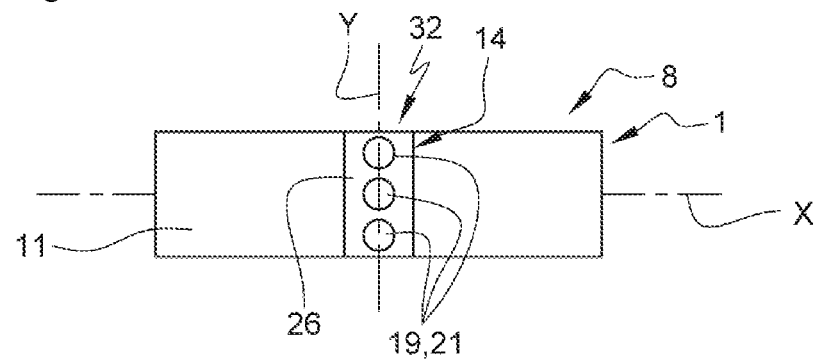
FIG. 9 is a schematic and partial top view of a vane illustrating a first example of an arrangement of a row of discharge openings on a lip.

FIG. 9 illustrates a first example of an arrangement of a row 32 of ducts 19 on a lip 14, wherein the discharge openings 21 of the ducts 19 of the row 32 are arranged at the outer face 26 of the lip 14. The discharge openings 21 are arranged along an axis Y which is tangent to the direction of rotation of the vane 1 about its axis of rotation X. The pitch between two discharge openings 21 is constant.

Figure 10:
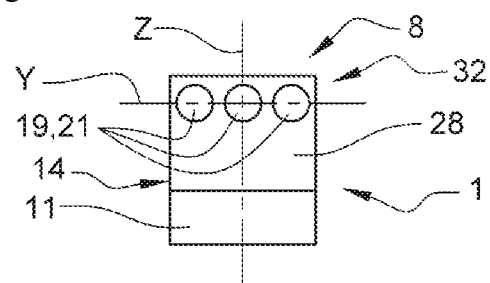
FIG. 10 is a schematic and partial side view of a vane illustrating a second example of an arrangement of a row of discharge openings on a lip.

FIG. 10 illustrates a second example of the arrangement of a row 32 of ducts 19 on a lip 14, in which the discharge openings 21 of the ducts 19 of the row 32 are arranged at the upstream face 28 of the lip 14. The discharge openings 21 are arranged along the axis Y which is tangent to the direction of rotation of the vane 1. The pitch between two discharge openings 21 is constant.

Figure 11:
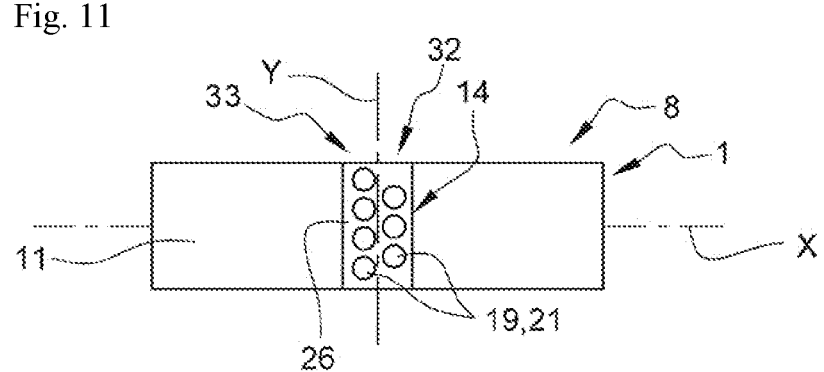
FIG. 11 is a schematic and partial top view of a vane illustrating an example of an arrangement of a first and second row of discharge openings on a lip.

FIG. 11 illustrates an example of the arrangement of a first and second row 32, 33 of ducts 19 on a lip 14, wherein the discharge openings 21 of the ducts 19 in the first row 32 are staggered with respect to the discharge openings 21 of the ducts 19 in the second row 33. The first and second rows 32, 33 comprise three and four ducts 19 respectively. The discharge openings 21 of the first and second rows 32, 33 are arranged at the outer face 26 of the lip 14. The discharge openings 21 of the first and second rows 32, 33 are arranged along the axis Y.

In FIGS. 3 to 11, each of the ducts 19 (respectively the discharge openings) has a constant circular cross section along its axis of elongation A.

Figure 12:
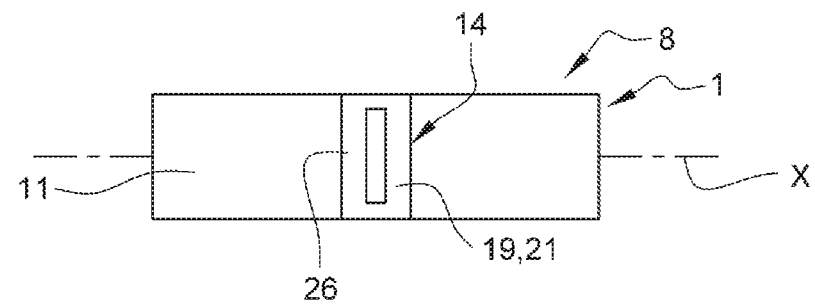
FIG. 12 is a schematic and partial top view of a vane illustrating a first alternative embodiment of a duct.

FIG. 12 illustrates a first alternative embodiment of a duct 19 in which the duct 19 (respectively the discharge opening) has a rectangular cross-section along its axis of elongation A.

Figure 13:
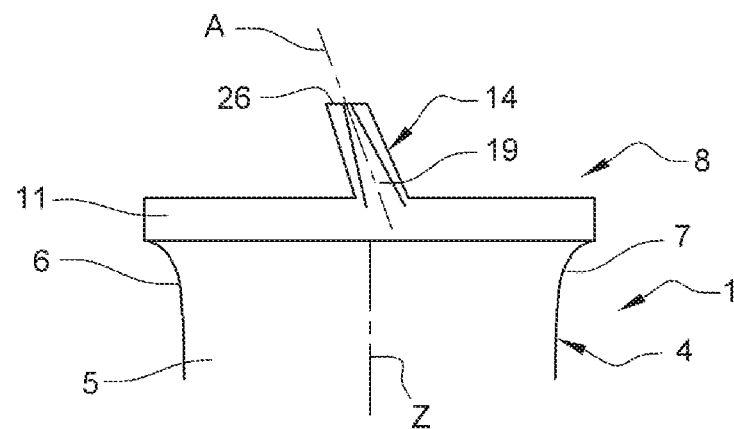
FIG. 13 is a schematic and partial front view of a vane illustrating a second alternative embodiment of a duct.

FIG. 13 illustrates a second alternative embodiment of a duct 19 in which the duct 19 has a variable cross section along its axis of elongation A.

Figure 14:
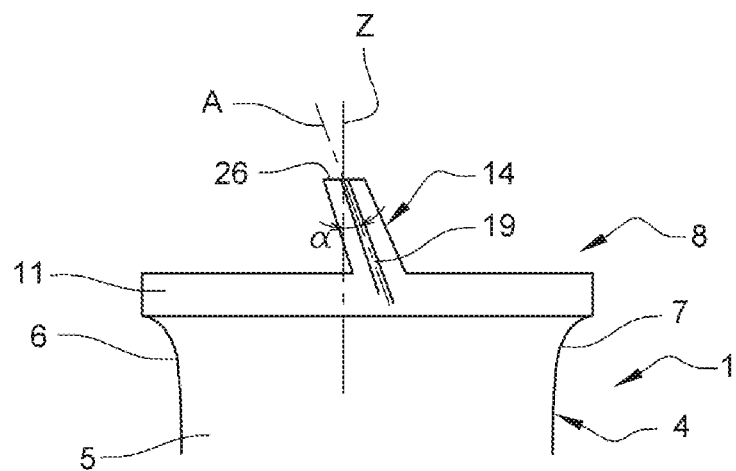
FIG. 14 is a schematic and partial front view of a vane illustrating an example of orientation of a duct.

FIG. 14 illustrates an example of an orientation of a duct 19 in which the duct 19 (or the axis of elongation A of the duct) is, in a longitudinal plane, inclined at an acute angle α upstream with respect to the stacking axis Z.

The blade 1 is for example produced by a method comprising firstly obtaining a raw vane casting by a lost wax casting process, and secondly various machining operations carried out on the raw vane (such as the drilling of the ducts) in order to obtain a vane with definitive dimensions as detailed in the definition drawing.

The vane 1 could also be obtained by additive manufacturing (rapid prototyping).

The invention claimed is:
1. movable vane for a wheel of an aircraft turbine engine, the vane comprising an aerodynamic blade extending along a radial stacking axis, the blade having a pressure surface and a suction surface which are connected to each other by a leading edge and a trailing edge, the blade being delimited by an inner root and an outer heel along the radial stacking axis, the heel comprising an outer platform and a first contact sealing lip protruding radially outward from the outer platform, the first contact sealing lip cooperating with a block of abradable material,
wherein the outer platform is delimited by an upstream edge, a downstream edge, a pressure edge which is arranged on the side of the pressure surface of the blade, and a suction edge which is arranged on the side of the suction surface of the blade,
wherein the first contact sealing lip extends circumferentially from the pressure edge to the suction edge of the outer platform,
wherein the first contact sealing lip comprises an upstream face, a downstream face, a pressure face which is arranged on the side of the pressure surface of the blade, a suction face which is arranged on the side of the suction surface of the blade, and an outer face,
wherein the outer face of the first contact sealing lip connects the upstream and downstream faces and the pressure and suction faces together,
wherein the vane comprising an internal circuit capable of receiving a first minor gas flow, said internal circuit comprising a supply cavity opening at the inner root via at least one inlet opening,
wherein the circuit comprises at least a first duct and a second duct which are each connected with the supply cavity, each of the first and second ducts opening onto an external surface of the first contact sealing lip via a discharge opening so that a gas jet of the first minor gas flow is adapted to be expelled from each discharge opening, each of the first and second ducts being oriented such that the corresponding gas jet is adapted to be projected towards a second minor gas flow leaking between the heel and a directly adjacent member, the discharge opening of the first duct being arranged at the outer face of the first contact sealing lip, and the discharge opening of the second duct being arranged at the pressure face or the suction face of the first contact sealing lip,
wherein the heel comprises a second contact sealing lip projecting radially outward from the outer platform, the second contact sealing lip being distant from the first contact sealing lip, the second contact sealing lip cooperating with the block of abradable material,
wherein the circuit comprises at least a third duct and a fourth duct which are each connected with the supply cavity, each of the third and fourth ducts opening onto an external surface of the second contact sealing lip via a discharge opening so that a gas jet of the first minor gas flow is adapted to be expelled from each discharge opening, each of the third and fourth ducts being oriented such that the corresponding gas jet is adapted to be projected towards the second minor gas flow leaking between the heel and a directly adjacent member,
wherein the second contact sealing lip extends circumferentially from the pressure edge to the suction edge of the outer platform,
wherein the second contact sealing lip comprises an upstream face, a downstream face, a pressure face which is arranged on the side of the pressure surface of the blade, a suction face which is arranged on the side of the suction surface of the blade, and an outer face,
wherein the outer face of the second contact sealing lip connects the upstream and downstream faces of the second contact sealing lip and the pressure and suction faces of the second contact sealing lip together,
wherein the discharge opening of the third duct is arranged at the outer face of the second contact sealing lip, and the discharge opening of the fourth duct being arranged at the pressure face or the suction face of the second contact sealing lip.

2. The vane according to claim 1, wherein at least one of the first and second ducts has a variable cross-section which converges towards the corresponding discharge opening.

3. The vane according to claim 1, wherein the supply cavity is adapted to receive the first minor gas flow escaping from a vein via at least the inlet opening, the vein being adapted to receive a major gas flow.

4. The vane according to claim 1, wherein each discharge opening is circular.

5. The vane according to claim 4, wherein the diameter of the discharge opening of each of the first and second ducts is between 0.2 mm and 2 mm.

6. A wheel for an aircraft turbine engine, comprising a disc carrying at its periphery an annular row of vanes, each vane according to claim 1.

7. An aircraft turbine engine, comprising said vane according to claim 1.

8. An aircraft turbine engine according to claim 1, comprising a wheel including a disc carrying at its periphery an annular row of said vanes.

9. The vane according to claim 4, wherein the diameter of the discharge opening of each of the first and second ducts is between 0.3 mm and 0.6 mm.

10. The vane according to claim 1, wherein the outer face of the first contact sealing lip is delimited circumferentially by a pressure end which is arranged on the side of the pressure surface of the blade, and a suction end which is arranged on the side of the suction surface of the blade, wherein the discharge opening of the first duct is equidistant from the pressure and suction ends of the outer face of the first contact sealing lip.

11. The vane according to claim 1, wherein the pressure face of the first contact sealing lip is delimited radially by an outer end and an inner end,
wherein the suction face of the first contact sealing lip is delimited radially by an outer end and an inner end,
wherein the discharge opening of the second duct is closer to the outer end of the pressure face than the inner end of the pressure face, when the discharge opening of the second duct is arranged at the pressure face of the first contact sealing lip, and
wherein the discharge opening of the second duct is closer to the outer end of the suction face than the inner end of the suction face, when the discharge opening of the second duct is arranged at the suction face of the first contact sealing lip.

12. The vane according to claim 1, wherein the movable vane is mobile in rotation around a longitudinal axis, the first duct being inclined at an acute angle upstream with respect to the radial stacking axis, the acute angle being measured in a longitudinal plane.

13. The vane according to claim 1, wherein the first duct has a variable cross-section which converges towards the corresponding discharge opening,
wherein the movable vane is mobile in rotation around a longitudinal axis, the first duct being inclined at an acute angle upstream with respect to the radial stacking axis, the acute angle being measured in a longitudinal plane.

14. The vane according to claim 1, wherein the circuit comprises a first row of at least three first ducts, the at least three first ducts of the first row being connected with the supply cavity and each opening onto the outer face of the first contact sealing lip via a discharge opening,
wherein the circuit comprises a second row of at least three first ducts, the at least three first ducts of the second row being connected with the supply cavity and each opening onto the outer face of the first contact sealing lip via a discharge opening,
wherein each discharge opening of the at least three first ducts of the first row being staggered with respect to each discharge opening of the at least three first ducts of the second row.

15. The vane according to claim 1, wherein the circuit comprises a first row of at least three first ducts, the at least three first ducts of the first row being connected with the supply cavity and each opening onto the outer face of the first contact sealing lip via a discharge opening,
wherein the circuit comprises a second row of at least three second ducts, the at least three second ducts of the second row being connected with the supply cavity and each opening onto the pressure face or the suction face of the first contact sealing lip via a discharge opening.

16. The vane according to claim 1, wherein the first and second contact sealing lips are inclined upstream at an acute angle relative to the radial stacking axis.

17. The vane according to claim 1, wherein the circuit comprises a first row of at least three first ducts, the at least three first ducts of the first row being connected with the supply cavity and each opening onto the outer face of the first contact sealing lip via a discharge opening, wherein the circuit comprises a second row of at least three third ducts, the at least three third ducts of the second row being connected with the supply cavity and each opening onto the outer face of the second contact sealing lip via a discharge opening.

* * * * *